United States Patent [19]

Zaidi et al.

[11] Patent Number: 4,891,261

[45] Date of Patent: Jan. 2, 1990

[54] THERMOPLASTIC STOCK SHAPE AND METHOD FOR MAKING THE SAME

[75] Inventors: Mohammad A. Zaidi, Monroeville; Leo A. Vivola, New Kensington, both of Pa.

[73] Assignee: Aluminum Company of America, Pittsburgh, Pa.

[21] Appl. No.: 161,526

[22] Filed: Feb. 29, 1988

[51] Int. Cl.$^4$ ............................................. B32B 27/36
[52] U.S. Cl. ......................................... 428/220; 428/1
[58] Field of Search .............................. 428/1, 220, 480

[56] References Cited

U.S. PATENT DOCUMENTS

| | | | |
|---|---|---|---|
| 3,637,595 | 1/1972 | Cottis et al. | 260/47 C |
| 3,884,876 | 5/1975 | Cottis et al. | 260/47 C |
| 4,083,829 | 4/1978 | Calundann et al. | 260/47 |
| 4,184,996 | 1/1980 | Calundann | 260/40 R |
| 4,266,919 | 5/1981 | Dunnington et al. | 425/102 |
| 4,325,903 | 4/1982 | Wissbrun et al. | 264/176 R |
| 4,332,759 | 6/1982 | Ide | 264/108 |
| 4,352,927 | 10/1982 | Cogswell et al. | 528/502 |
| 4,447,599 | 5/1984 | Cogswell et al. | 528/502 |
| 4,468,364 | 8/1984 | Ide | 264/176 R |
| 4,563,508 | 1/1986 | Cottis et al. | 525/444 |

FOREIGN PATENT DOCUMENTS

| | | |
|---|---|---|
| 95865 | 7/1983 | European Pat. Off. . |
| 89323 | 5/1983 | Japan . |
| 58829 | 4/1985 | Japan . |
| 2167514 | 5/1986 | United Kingdom . |

OTHER PUBLICATIONS

"Liquid-Crystal Polymers: How They Process and Why", *Plastics Engineering*, 12/1986, pp. 39-42, Duska.
Liquid-Crystal Polymers: Now They are Melt-Processable, Wood, *Modern Plastics* Int. Sep. 1985, pp. 66-69.
Orientation Development in Thermotropic Liquid Crystal Polymers, Ide et al., *Polymer Engineering and Science*, 4/83, vol. 23, No. 5.
Liquid Crystal Polymers Are Extrudable and Thermoformable, Plastics Technology, Feb. 1986, pp. 23, 25, 27.
"Processing of Semicrystalline Polymers by High-Stress Extrusion", Kalbecle et al., *Journal of Polymer Science*, 1977, pp. 27-42.
"Liquid Crystalline Polymers to Mining Applications", *Encyc. Polymer Science and Engineering*, Wiley & Sons, 1987, pp. 1-67.
"Orientation Behavior in Smectic Copolyesters During Extrusion", Kanamoto et al., *Kobunshi Konbunshu*, 1986.

*Primary Examiner*—Alexander S. Thomas
*Attorney, Agent, or Firm*—Gary P. Topolosky

[57] ABSTRACT

A method for making stock shapes from a composition which includes a liquid crystal polymer having a high crystallization temperature, said method comprising: (a) densifying the composition into a compact; and (b) processing the compact at one or more temperatures below the crystallization temperature using a moderate to high strain rate. For the liquid crystal polymer consisting essentially of p, p' biphenol, p-hydroxybenzoic acid and terephthalic acid monomers and sold under the trademark "Xydar®", a preferred embodiment includes heating the compact to one or more temperatures between about 400°–650° F.; and extruding the heated compact in the solid state through a uniform flow-type die at a strain rate of at least about 2 sec$^{-1}$. Thermoplastic stock shapes weighing about four or more pounds and having thicknesses in all dimensions greater than the maximum thickness obtainable through injection molding are also disclosed.

15 Claims, 1 Drawing Sheet

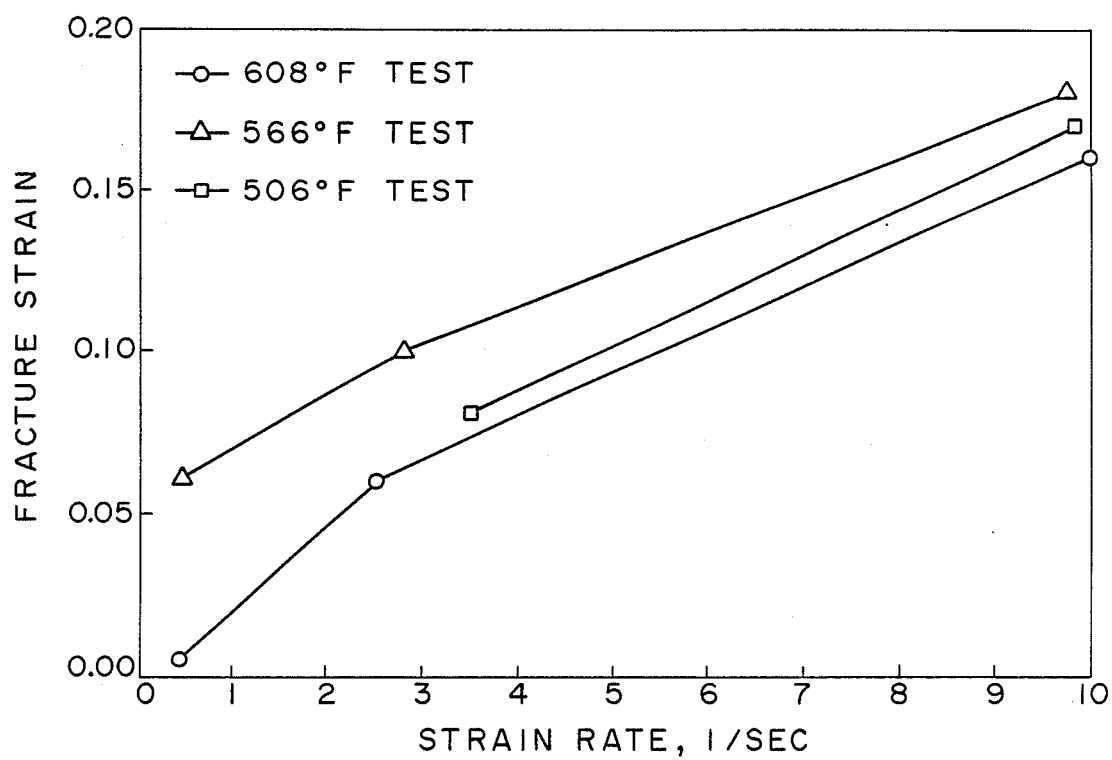

THERMOPLASTIC STOCK SHAPE AND METHOD FOR MAKING THE SAME

BACKGROUND OF THE INVENTION

This invention relates to the field of liquid crystal polymer processing. The invention further relates to a method for making stock shapes from a composition which includes an aromatic polyester sold under the trademark "Xydar ®".

Low molecular weight liquid crystalline compounds have been known for many years. Liquid crystal polymers (LCP's) have attained greater prominence in only the last 20 years, however, due to the discovery of higher molecular weight aramids and thermotropic polyesters. LCP's are generally divided into two groups depending upon whether they exhibit liquid crystalline or anisotropic order in solution (lyotropic) or in the melt phase (thermotropic). The presence of such crystals (or crystalline properties) in a particular polymer may be confirmed by conventional polarized light techniques using crossed polarizers.

Thermotropic liquid crystal polymers have been described in numerous ways by such terms as "liquid crystalline", "liquid crystal" or "anisotropic". It is believed that the polymers comprising this group involve a parallel ordering of molecular chains. Depending upon the order of molecules relative to one another, liquid crystal polymers may be characterized as possessing a mesophasic structure which is either: cholesteric, smectic or nematic. Thermotropic LCP's include, but are not limited to, wholly aromatic polyesters, aromatic-aliphatic polyesters, aromatic polyazomethines, aromatic polyester-carbonates and wholly (or non-wholly) aromatic polyester-amides. Typically, LCP's are prepared from long and flat monomers which are fairly rigid along their molecular axes. These polymers also tend to have coaxial or parallel chain-extending linkages therebetween. To be considered wholly aromatic, each monomer of an LCP must contribute at least one aromatic ring to the polymeric backbone. It is believed that such universal contribution of aromatic rings enables these polymers to exhibit anisotropic properties in their melt phases.

Some of the monomers used for forming thermotropic LCP's include those derived from aromatic diols, amines, diacids and/or aromatic hydroxyacids. For some time now, there has been produced a family of polymers notable for their high temperature performance and self-reinforcement properties. The aromatic polyester sold by Dartco Manufacturing, Inc. of Augusta, Ga. under the trademark "Xydar ®" consists essentially of p, p' biphenol, p-hydroxybenzoic acid, and terephthalic acid monomers. Xydar ® is commercially available in various grades including a substantially pure (or neat) form, Xydar ® SRT-300, and the lower grade SRT-500 product. Xydar ® powders are also combinable with certain fillers. For example, Xydar ® MD-5 is approximately 50% glass-filled, FSR-315 is about 50% talc-filled, and FC-130 contains about 50% mineral filler.

Xydar ® is an attractive thermotropic LCP for various applications due to the following properties. In its neat form, SRT-300 possesses a deflection temperature of about 671° F. under a flexural load of about 264 psi. Xydar ® SRT-300 can be used in continuous electrical service at temperatures as high as 464° F. for over 100,000 hours. When subjected to a three-point bend test, injection molded articles made from this LCP material possess an overall toughness of about 4.1 ksi-in$^{\frac{1}{2}}$. The material is essentially inflammable and radiation resistant. It generates very little smoke and does not drip when exposed to live flame. Xydar ® also serves as an excellent electrical insulator with high dielectric strength and outstanding arc resistance. It resists chemical attack from most polar and nonpolar solvents, including but not limited to: hot water, acetic acid, other acids, methyl ethyl ketone, isopropyl alcohol, trichloroethylene, caustics, bleaches and detergents. Xydar ® resins are virtually uneffected by exposure to hydrocarbons and have very low coefficients of friction. This material also possesses an ability to retain substantially high strength levels at relatively high temperatures. For example, the tensile strength and tensile modulus of an injection molded SRT-300 article change with temperature as follows:

TABLE I

| Temperature | Tensile Strength (KSI) | Tensile Modulus (MPSI) |
| --- | --- | --- |
| 73° F. | 20 | 2.5 |
| 450° F. | 6.4 | 1.5 |
| 575° F. | 3.8 | 1.2 |

The effective crystallization temperature of Xydar ® SRT-300 is about 702° F. By this term, it is meant that at temperatures below about 702° F., Xydar ® exhibits nematic behavior. At or above this temperature, the liquid crystalline state allows Xydar ® to flow more readily. Substantially pure Xydar ® possesses a melting point of about 790° F., above which the material begins to degrade. Xydar ® also exhibits exceptional resistance to thermal oxidative degradation. Its decomposition temperature, as determined by thermogravimetric analysis, is about 1040° F. when measured in air and about 1053° F. in a nitrogen atmosphere.

With such excellent strength, lubricity, chemical resistance and other properties for temperatures ranging from below zero to its melting point of 790° F., Xydar ® should be useful for a wide range of applications. Because of its ability to withstand exposure to aeronautic hydraulic fluid, jet fuel, leaded gasoline, brake and transmission fluids, and ethylene glycol coolants, Xydar ®-containing compositions could be used to make internal components, fuel system parts, engine bearings, and other brackets, fasteners or housings for the automotive and/or aerospace industries. For the electronics industry, Xydar ®-containing sockets, chip carriers, high temperature connectors, and/or switches are envisioned. For the field of fiber optics, connectors, couplers, and buffers may be constructed from this material. Xydar ® might also find its way into such other consumer goods as household appliances, microwaveable housewares, and business, sports or recreation equipment.

Despite the foregoing list of potential applications, current Xydar ® usage remains limited by processing constraints. Prior to this invention, it was known to screw extrude or otherwise compact Xydar ® powders into pellets (or other particles of a sufficient size) for subsequent injection molding at temperatures substantially near or above its crystallization temperature. In promotional literature, Dartco recommends processing pelletized Xydar ® after the material has been dried at 300° F. for about eight hours to remove any surface moisture. These pellets may then be heated between about 752°-806° F. within a vented screw extruder having an injection pressure of about 14 ksi and a 20-24:1 length to diameter (L/D) ratio. Dartco further recommends using compression ratios between 2 or 3:1. Preferably, the mold into which Xydar ® is injected should also be heated to at least about 464° F. for promoting better, consistent material flow throughout.

Injection molding of Xydar ® into consumable goods, or parts for the same, is not without its limitations. Constraints relating to how rapidly Xydar ® cools and/or hardens limit the size of molds into which Xydar ® may be injected. These molds may have some disparity in width and/or length depending on the number of areas from which Xydar ® is injected. The maximum cross-sectional thickness of Xydar ® injection molds rarely, if ever, exceeds about 0.25 inch, however. Although occasional attempts at injecting Xydar ® into slightly thicker molds may succeed, Xydar ® cannot consistently fill such molds on a complete basis, thus resulting in products which have undesirable voids of material. Because of similar processing constraints, it is not possible to consistently or commercially injection mold Xydar ® into products weighing about four or more pounds. When injection molding Xydar ® in such quantities, incomplete mold filling more commonly results.

Other proposed techniques for processing Xydar ® have been unsuccessful. Several attempts were made at extruding Xydar ® in the solid state using the process parameters typically associated with extruding other polymers. These attempts only resulted in the production of defective stock shapes having repeated divergings into adjacent subsections. It is believed that such defects were due to die plugging. The end result was non-machinable and contained multiple fractures.

SUMMARY OF THE INVENTION

It is a principal object of this invention to provide a method for making stock shapes from a liquid crystal polymer having a high crystallization temperature. It is a further object of this invention to provide means for processing an aromatic polyester sold under the trademark Xydar ® other than through injection molding. It is still a further object to solid state extrude Xydar ® into various stock shapes having thicknesses in any or all dimensions greater than the maximum thickness obtainable through injection molding of Xydar ®. It is still a further object to provide means for making stock shapes from compositions which include a liquid crystal polymer consisting essentially of p, p' biphenol, p-hydroxybenzoic acid and terephthalic acid monomers. These compositions may also include one or more fillers selected from: talc, glass, alumina, and metal powders. It is still a further object to provide means for efficiently extruding Xydar ® and other high temperature LCP's into sheet, rod, plate, or other non-molded products having improved machinability and weighing about four or more pounds. It is still a further object to provide a method for continuously making thick stock shapes from Xydar ®-containing compositions. It is also an object of this invention to provide means for processing Xydar ® into products having a substantially uniform structure from skin to core and at least some degree of internal fibrousness.

In accordance with the foregoing objects of this invention, and other objects, features and advantages which will become apparent from the more detailed description which follows, there is provided a method for making stock shapes from a composition which includes a liquid crystal polymer having a high crystallization temperature. The method comprises: densifying the composition into a compact and processing the compact at one or more temperatures below the crystallization temperature using a moderate to high strain rate. There is also disclosed a method for continuously making stock shapes from a composition which includes a liquid crystal polymer having a crystallization temperature above about 500° F. The stock shapes produced by this method are thicker in all dimensions than the maximum thickness obtainable through injection molding his composition. Said stock shapes also have a substantially uniform structure from skin to core. The latter method consists of densifying the composition into a substantially pore-free compact and processing the compact in the solid state at one or more temperatures at least about 50° F. below its crystallization temperature using a strain rate greater than or equal to about 2 sec$^{-1}$, but less than the minimum strain rate for injection molding said composition. The thermoplastic stock shapes which result include a liquid crystal polymer consisting essentially of p, p' biphenol, p-hydroxybenzoic acid and terephthalic acid monomers. On a more preferred basis, the thick stock shapes of this invention consist essentially of the thermotropic, aromatic polyester sold as "Xydar ®".

BRIEF DESCRIPTION OF THE DRAWING

Further features, objects and advantages of this invention will be made clear from the following detailed description of preferred embodiments made with reference to the FIGURE wherein the effect of various strain rates on the fracture strain of extruded Xydar ® SRT-300 articles is shown for three extrusion temperature ranges.

DETAILED DESCRIPTION OF THE PREFERRED EMBODIMENTS

In the detailed description which follows, repeated reference is made to the solid state extrusion of a compound or composition consisting essentially of an aromatic polyester sold under the trademark "Xydar ®". It is to be understood, however, that the invention may be further applied to other liquid crystal polymers (LCP's) having a high crystallization temperature, typically at or above about 450°-500° F., or to compositions which include such LCP's together with other polymers, mineral, metallic and/or composite fillers.

As used throughout the claims and remaining description of this invention, the following terms shall have the meanings set forth hereinbelow:

(a) "Crystallization temperature" shall mean the temperature at which the polymer becomes liquid crystalline, thereby causing it to flow more readily as if in a liquid or more viscous state. It is also the minimum temperature at which LCP's may exist in the melt phase. For the aromatic polyester sold as "Xydar ®", the crystallization temperature is about 702° F.;

(b) "Substantially pore-free" shall refer to compacts which contain little to no pores or air pockets, such pores tending to interfere with efficient compact extrusion. Preferably, LCP's of the present invention are compacted to about 90-95% density, or at least about 98% density, with compaction to about 100% being most preferred. Such compaction levels may be achieved by any known or subsequently developed means including, but not limited to, hot isostatic pressing (HIP) and uniaxial hot pressing (UHP), alone or in combination with cold isostatic pressing (CIP);

(c) "Solid state extrusion" shall mean extrusion at one or more temperatures sufficiently below the temperature at which the LCP turns liquidous (or molten). Preferably, such extrusions proceed at temperatures well below the crystallization temperature of the liquid crystal polymer involved;

(d) "Continuously making" shall mean processing into indeterminate or unspecified lengths without concern for closed cavities or mold constraints. This term is further intended to cover those interruptions in extrusion processing caused by the need to resupply extrusion presses with more extrudable material;

(e) "Stock shape" shall mean any material shape which may be subsequently machined or otherwise formed into consumable goods, or parts for a consumable good. Exemplary stock shapes include, but are not limited to: cylindrical rods, tubes, plates or bars having polygonal cross sections, and various sheet products;

(f) "Machinable" shall mean capable of being further processed into a consumable product, or part for a consumable product, by known or subsequently developed techniques including drilling, milling, threading, cutting, planing or the like;

(g) "Uniform flow-type die" shall mean an extrusion die having a low degree of directional change when extruded material passes therethrough. Exemplary dies include the streamline die of the preferred embodiments herein, said die having a cross-sectional configuration which resembles the upper or lower half of an hourglass;

(h) "Strain rate" shall mean a value representative of: (i) the rate at which LCP-containing composition advances through an extrusion press; and (ii) the amount of pressure exerted on the material within said press. A "moderate to high" strain rate should be high enough for extruding LCP's in the solid state (i e., below their crystallization temperature), but also lower than those strain rates required for injection molding such LCP's (i.e., about 100 $sec^{-1}$ or more);

(i) "Thicker in all dimensions greater than the maximum thickness obtainable through injection molding" shall refer to stock shapes having thicknesses in any or all dimensions which are greater than those thicknesses consistently obtainable through injection molding LCP into a closed cavity or mold. Injection molded Xydar ® products, for example, are typically limited to maximum thicknesses of about 0.25 inch. These products may have lengths and widths substantially greater than about 0.25 inch, but injection into still thicker molds is often precluded by mold filling problems;

(j) "Substantially uniform structure" shall mean having a structure which is substantially consistent from skin (or outer shell) to core (or inner structure);

(k) "At least some degree of internal fibrousness" shall be used to distinguish the invention from those products which may be formed by pressing LCP's directly into the desired, final shape without resort to injection molding, extrusion or other further processing. Injection molded Xydar ® products exhibit substantially total fibrousness throughout. Solid state extrusions according to the invention include at least some internal fibrousness, usually between about 15-75% fibrousness beneath the skin or outer shell. Hot pressed equivalents, on the other hand, possess substantially no internal fibrousness; and (l) When stating numerical ranges for any treatment temperature or strain rate herein, it is intended that each stated range shall expressly designate and include every number, fraction and/or decimal, between the stated minimum and maximum. For example, 500°-600° F. shall include 501°, 502°, 503° and 504° ... up to and including 598°, 599° and 600° F. Similarly, a strain rate between about 5-20 $sec^{-1}$ shall include strain rates of about 5.25, 5.5, 5.75 ... as well as 6, 6½, 6¾ $sec^{-1}$ and up through the stated maximum.

In the practice of this invention, there is disclosed a method for making stock shapes from a composition which includes a liquid crystal polymer having a high crystallization temperature. The method comprises (a) densifying the composition into a compact and (b) processing the compact at one or more temperatures below the crystallization temperature using a moderate to high strain rate. In preferred embodiments, the composition to be densified and processed consists essentially of the liquid crystal polymer (LCP). It is to be understood, however, that the invention may also be used to extrude stock shapes from compositions which include the liquid crystal polymer as part of a blend or mixture, the other part of said mixture being a filler selected from such materials as talc, glass, alumina or other minerals. The composition might also include quantities of metal or metal powder selected from such metals as aluminum, magnesium, lithium and alloys thereof.

On a more preferred basis, the liquid crystal polymer that is formed into thick stock shapes comprises an aromatic polyester consisting essentially of p, p' biphenol, p-hydroxybenzoic acid and terephthalic acid monomers. When heated to temperatures above its crystallization temperature, this thermotropic polyester exhibits nematic properties. An exemplary LCP consisting essentially of these monomers is sold commercially by Dartco Manufacturing Co., of Augusta, Ga. under the trademark "Xydar ®". In its substantially pure (or neat) form, Xydar ® SRT-300 exists as either pellets or finely grained powder. Other Xydar ®-containing compositions may also be used with this invention, including lower grade Xydar ® SRT-500 and those mixtures containing greater than or less than about 50 wt. % Xydar ®. 50:50 mixtures of Xydar ® and various fillers may also be extruded according to the invention.

In preferred embodiments, the method of this invention commences by pressing the aforementioned composition into a substantially pore-free compact. This may be done by any known or subsequently developed means, or combination of pressing means, including hot isostatic pressing (HIP), uniaxial hot pressing (UHP) and/or cold isostatic pressing (CIP). When CIP is used within the densifying recitation of this method, it is most preferred to degas the compact prior to further processing for safety reasons. The resulting compact, or billet, should be substantially dense, most preferably, as close to 100% dense as possible, for enhancing process efficiency and reducing the risk of accident caused by extruding compacts which contain gas or other entrapped pockets of air. When size of the compact prior to extrusion is a concern, it is known that the compact may be partially scalped, decanned or otherwise reduced in size (overall diameter).

Preferred embodiments of the invention proceed by extruding the compact (or billet) through a uniform flow-type die at a moderate to high strain rate. The use of such dies substantially reduces the problems associated with extruding LCP's through a flat-faced die or other configuration having a high degree of directional change. By lessening the degree of disruptive forces exerted on Xydar ® during extrusion, it is believed that a more consistent, substantially uniform stock shape results. The internal strength of this extruded product may also be enhanced by exploiting the directional flow characteristics of Xydar ® through such preferred die configurations. On a most preferred basis, Xydar ®-containing compositions are ram extruded through a streamline die using a direct extrusion press. It is to be understood, however, that other dies also having low degrees of directional change, including conical-shaped dies, may be used with this invention. It is to be further understood that indirect extrusion presses may also be used herewith.

Preferred embodiments of this invention include processing compacts of Xydar ®-containing compositions at one or more temperatures between about 400°-650° F., it being understood that compact heating at one continuous temperature within an extrusion press or external furnace may be precluded by many factors. More preferably, Xydar ® compacts are extruded at one or more temperatures between about 500°-600° F. It is further believed that gradual heating of the compact to the aforesaid temperatures improves product quality and extrusion efficiency. For example, compact heating in a furnace at rates of about 1.8° F. (1° C.) per minute prior to loading and extrusion causes less thermal shock, thus resulting in fewer thermally-generated cracks in the compact to be extruded.

The preferred strain rate for Xydar ® processing should be maintained at or above the minimum rate of about 2 sec$^{-1}$, although solid state extrusion strain rates as low as 1 or 1.5 sec$^{-1}$ may also suffice depending upon the type and amount of other filler materials added to Xydar ®. On a more preferred basis, Xydar ®-containing compacts are solid state extruded at one or more rates between about 5-20 sec$^{-1}$, with a strain rate of about 10 sec$^{-1}$ being most preferred. In any event, the present invention proceeds at much lower strain rates than those typically required for injection molding this LCP, typically about 100 sec$^{-1}$ or more.

With the foregoing methods, it is possible to process Xydar ®-containing compositions into stock shapes having thicknesses in all dimensions which are greater than the maximum thickness obtainable through injection molding. In fact, the invention may be used to produce various machinable Xydar ® shapes having thicknesses which exceed about 0.5 inch, and more preferably about one inch or more, in all dimensions. It is also possible to extrude Xydar ® according to the invention into products weighing about four or more pounds. Solid state extrusions of at least about ten pounds of Xydar ® have been successful. Based on such successes, it is conceivable to extrude Xydar ® into stock shapes weighing well over 25, 50 or even 100 pounds.

Analyses were conducted on 100% dense Xydar ® SRT-300 compacts that were solid state extruded at various temperatures and strain rates. The peak strengths of the extruded shapes that were produced were then measured for comparison purposes. The fracture strain, or percent of deformation tolerated before fracture, for each specimen was measured as reported at Table II and plotted relative to strain rate in the accompanying FIGURE.

TABLE II

| Specimen | Extrusion Temperature | Strain Rate (sec$^{-1}$) | Peak Strength (MPa) | Fracture Strain (%) |
|---|---|---|---|---|
| 1 | 606 | 10.0 | 11.3 | 16 |
| 2 | 605 | 2.5 | 11.25 | 6 |
| 3 | 612 | 0.42 | 10.2 | 0.5 |
| | Average 608 | | | |
| 4 | 559 | 9.71 | 13.3 | 18 |
| 5 | 560 | 2.8 | 11.3 | 10 |
| 6 | 580 | 0.44 | 10.7 | 6 |
| | Average 566 | | | |
| 7 | 504 | 9.4 | 15.9 | 17 |
| 8 | 509 | 3.5 | 11.5 | 8 |
| | Average 506 | | | |

From this FIGURE, it can be seen how fracture strain for extruded Xydar ® products improves rather linearly with increasing strain rate. The greatest improvement to fracture strain was realized at intermediate extrusion temperatures between about 550°-575° F., rather than at higher extrusion temperatures, however.

EXAMPLE

Using a 1500-ton direct extrusion press, a reduction ratio of about 40:1, an extrusion pressure of about 22 ksi and a streamline die manufactured by the Garbell Tool & Die Company of Opa-Locka, Fla., a compacted billet of Xydar ® SRT-300 was continuously ram extruded into a one-inch diameter rod, measuring about 19 pounds total weight. This rod showed no evidence of die plugging and was easily machinable into a variety of shapes and articles.

Certain properties of solid state extruded Xydar ® rod were then compared with an injection molded bar of Xydar ® SRT-300 having a total thickness of only 0.1 inch. The extruded rod showed significantly improved ratios of skin strength to core strength, together with slightly increased density due to greater compaction. Solid state extrusion of Xydar ® also results in a noticeable increase in product melting point. Particular properties of the one-inch extruded rod are listed in the following Table for comparison with the thinner, injection-molded bar.

TABLE III

| Properties | Extruded Rod (1-inch Diameter) | Injection Molded Bar (0.1-inch Thick) |
|---|---|---|
| Tensile strength at 73° F. (ksi): | | |
| Skin | 7.9 | 20 |
| Core | 7.6 | 6.2 |
| Tensile elongation | 0.8 | 1.5 |
| Flex strength at 73° F. (ksi) | 7.7 | 19 |
| Flex modulus: | | |
| at 73° F. (mpsi) | 0.67 | 2.0 |
| at 575° F. (mpsi) | 0.22 | 0.41 |
| Density (g/ml) | 1.42 | 1.39 |
| Melting point (° F.) | 824 | 790 |

Having described the presently preferred embodiments, it is to be understood that the invention may be otherwise embodied within the scope of the appended claims.

What is claimed is:

1. An extruded shape having substantially uniform tensile strength properties in its surface and core regions, having a cross-sectional region with minimum dimensions of about 0.5 inch and having substantial internal fibrousness, said stock shape comprising a liquid crystal polymer having a crystallization temperature above about 500° F.

2. The stock shape of claim 1 which comprises the liquid crystal polymer available under the trademark "Xydar®".

3. The stock shape of claim 1 which further includes one or more of: talc, glass, alumina, mineral filler, aluminum powder, magnesium powder and lithium powder.

4. The stock shape of claim 1 which weighs about four or more pounds.

5. The stock shape of claim 4 which weighs at least about 25 pounds.

6. The stock shape of claim 1 wherein the liquid crystal powder includes p, p' biphenol, p-hydroxybenzoic acid and terephtalic acid monomers.

7. An elongate solid state extrusion comprising a liquid crystal polymer that includes p, p' biphenol, p-hydroxybenzoic acid and terephtalic acid monomers, said extrusion having a cross-sectional width and thickness greater than about 0.05 inch, substantially similiar tensile strength properties through its cross-section and some degree of internal fibrousness.

8. The solid state extrusion of claim 7 which comprises an aromatic polyester available under the trademark "Xydar®".

9. The solid state extrusion of claim 7 which further includes one or more of: talc, glass, alumina, mineral filler, aluminum powder, magnesium powder and lithium powder.

10. The solid state extrusion of claim 7 which has cross-sectional dimensions of about 0.5 inch or more and about 15-75% internal fibrousness.

11. The solid state extrusion of claim 7 which has cross-sectional dimensions of about one inch or more and about 15-75% internal fibrousness.

12. An extruded liquid crystal polymer stock shape comprising p, p' biphenol, p-hydroxybenzoic acid and terephthalic acid monomers, said stock shape having a minimum cross-sectional thickness of about 0.5 inch in all dimensions, having substantial internal fibrousness and having substantially uniform tensile strength properties in its surface and core regions.

13. The stock shape of claim 12 which comprises an aromatic polyester available under the trademark "Xydar®".

14. The stock shape of claim 12 which further includes one or more of: talc, glass, alumina, mineral filler, aluminum powder, magnesium powder and lithium powder.

15. An extruded elongate product comprising a liquid crystal polymer having a crystallization temperature above about 500° F., said elongate product having: (a) a cross-sectional thickness of at least 0.5 inch in all dimensions; (b) about 15-75% internal fibrousness; and (c) a substantially uniform tensile strength properties in its surface and core regions.

* * * * *

UNITED STATES PATENT AND TRADEMARK OFFICE
CERTIFICATE OF CORRECTION

PATENT NO.    : 4,891,261
DATED         : January 2, 1990
INVENTOR(S)   : Mohammad A. Zaidi and Leo A. Vivola It is certified that error appears in the above-identified patent and that said Letters Patent is hereby corrected as shown below:

| | |
|---|---|
| Claim 1, Col. 9, line 6 | After "extruded", insert --stock-- |
| Claim 6, Col. 9, line 26 | Change "powder" to --polymer-- |
| Claim 15, Col. 10, line 31 | Before "0.5 inch", insert --about-- |

Signed and Sealed this

Twenty-ninth Day of December, 1992

*Attest:*

DOUGLAS B. COMER

*Attesting Officer*     Acting Commissioner of Patents and Trademarks